ADJUSTABLE SUBREFLECTOR WITH POWER OPERATORS

Filed Jan. 18, 1965 7 Sheets-Sheet 1

INVENTOR.
ZOLTAN J. JASZBERENYI
BY Lyon & Lyon
ATTORNEYS

ADJUSTABLE SUBREFLECTOR WITH POWER OPERATORS

Filed Jan. 18, 1965 7 Sheets-Sheet 2

INVENTOR
ZOLTAN J. JASZBERENYI
BY Lyon & Lyon
ATTORNEYS

INVENTOR.
ZOLTAN J. JASZBERENYI
BY Lyon & Lyon
ATTORNEYS

INVENTOR.
ZOLTAN J. JASZBERENYI
BY Lyon & Lyon
ATTORNEYS

ADJUSTABLE SUBREFLECTOR WITH POWER OPERATORS

Filed Jan. 18, 1965

INVENTOR
ZOLTAN J. JASZBERENYI
BY Lyon & Lyon
ATTORNEYS

ADJUSTABLE SUBREFLECTOR WITH POWER OPERATORS

Filed Jan. 18, 1965 7 Sheets-Sheet 6

INVENTOR.
ZOLTAN J. JASZBERENYI
BY Lyon & Lyon
ATTORNEYS

ADJUSTABLE SUBREFLECTOR WITH POWER OPERATORS

INVENTOR.
ZOLTAN J. JASZBERENYI
BY Lyon & Lyon
ATTORNEYS

United States Patent Office 3,386,100

Patented May 28, 1968

3,386,100

ADJUSTABLE SUBREFLECTOR WITH POWER OPERATORS

Zoltan J. Jaszberenyi, San Diego, Calif., assignor to Whittaker Corporation, Los Angeles, Calif., a corporation of California Filed Jan. 18, 1965, Ser. No. 426,087

8 Claims. (Cl. 343—761)

ABSTRACT OF THE DISCLOSURE

A subreflector is mounted on a large parabolic type antenna reflector for independent movement and adjustment in any one of three mutually perpendicular directions. A frame is supported by the large reflector. A first carriage is slidably mounted on the frame, a second carriage is slidably mounted on the first carriage. A third carriage in the form of a drum is slidably mounted on the second carriage. The subreflector is mounted on this third carriage. Three linear actuators, one for each of the carriages, are operated independently of each other to obtain this independent movement and adjustment.

The present invention relates to antenna constructions and in particular to an adjustable mounting for a subreflector whereby the subreflector may be accurately adjusted in relationship to a main reflector in, for example, a Cassegrain antenna system.

Briefly, as described herein, there is provided a supporting frame which is rigidly connected by spars to the main reflector, and within such supporting frame (which may be considered stationary) there is a carriage structure slidably mounted within such supporting frame for movement therein in a vertical direction to obtain a so-called Y adjustment. Slidably mounted within such carriage for movement in a horizontal direction and to obtain a so-called X adjustment is a drum structure; and slidably mounted on said drum structure for movement in a direction perpendicular to said Y–X directions is a supporting structure for the subreflector. The carriage structure and the drum structure are moved linearly by a corresponding linear actuator. The supporting structure for the subreflector is moved by a rotatable screw member driven by a motor, with such screw member engaging a nut structure stationarily mounted on the drum structure. Means are also provided for an initial adjustment of the subreflector on the supporting structure for the same.

It is therefore a general object of the present invention to provide improved means whereby an antenna element may be adjusted in either the X direction, the Y direction or the Z direction to thereby effectively and accurately position the subreflector in three mutually perpendicular directions.

A specific object of the present invention is to provide an adjustment of the antenna indicated above.

Another specific object of the present invention is to provide an arrangement for accurately positioning a large subreflector from a remote location for optimum conditions in tracking of a satellite.

Another specific object of the present invention is to provide an arrangement of this character wherein lost motion between movable parts is reduced to a minimum whereby settings of the subreflector may be accurately correlated with reproducible settings of the remote control.

Another specific object of the present invention is to provide an arrangement of this character which is reliable and accurate and in which adjustments may be obtained using relatively small amounts of power.

Another specific object of the present invention is to provide an arrangement of this character in which the adjustments so obtained are not appreciably affected by extraneous forces such as, for example, wind forces.

Another specific object of the present invention is to provide an arrangement of this character which is simple and of light weight considering the functions and high accuracy achieved.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIG. 1 serves to illustrate generally the mounting of the subreflector with respect to the main reflector.

Figures 12, 13, 14, 15:
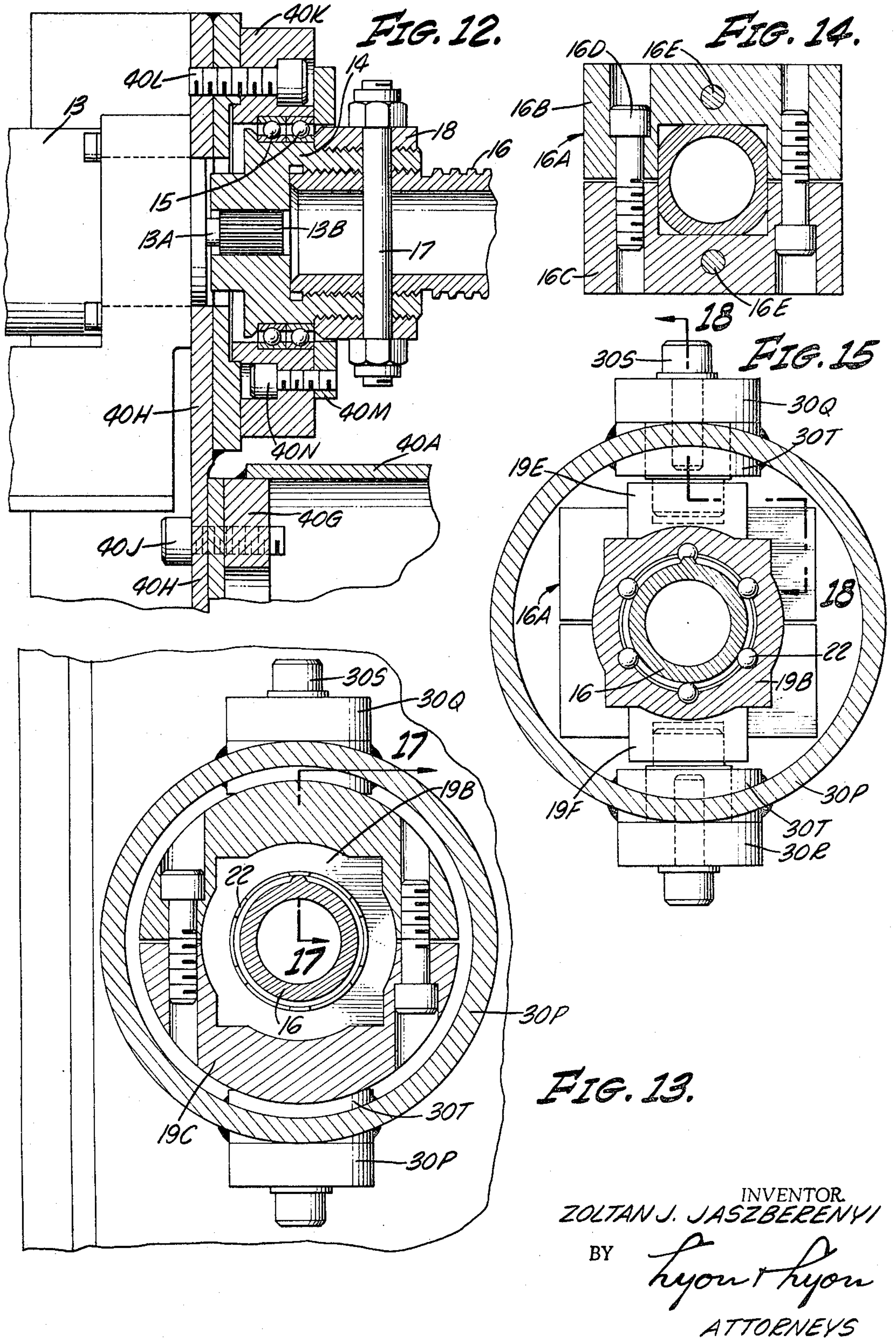
FIG. 12 is a sectional view taken substantially as indicated by the lines 12—12 in FIG. 2.
Figure 16:
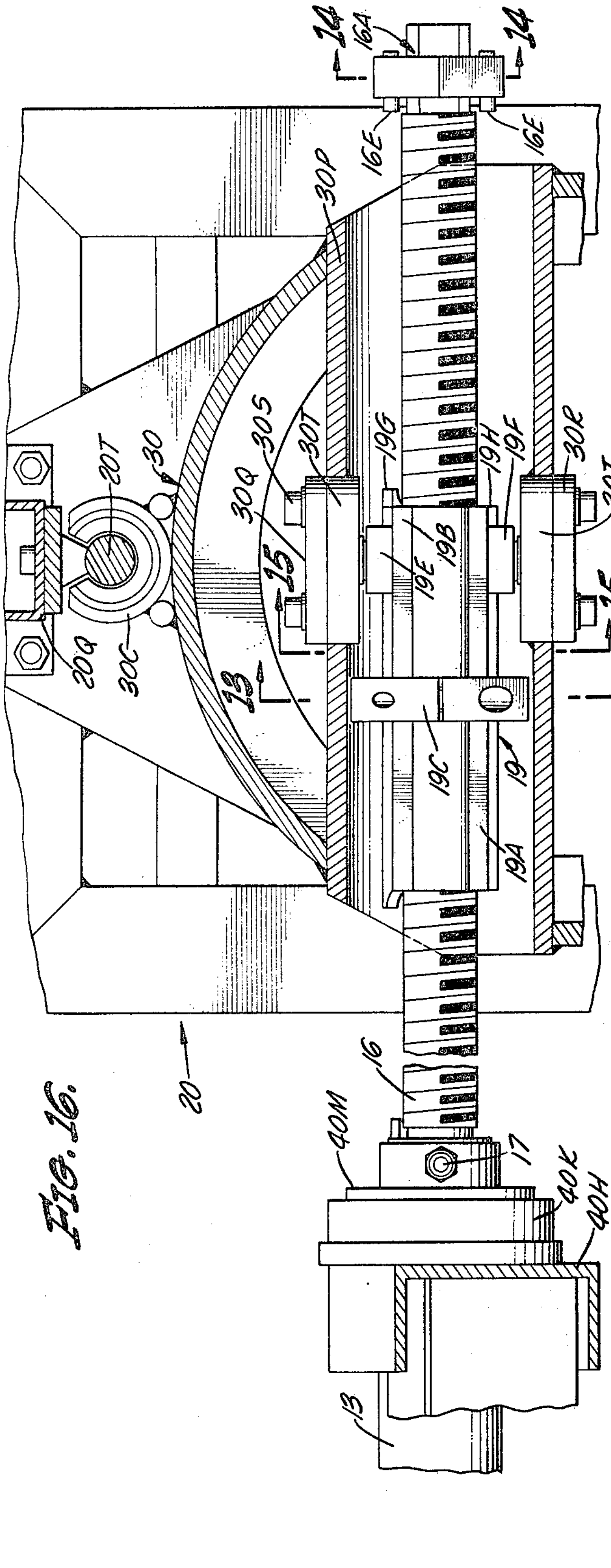

FIGS. 13, 14 and 15 are views taken substantially along corresponding lines 13—13, 14—14, and 15—15 in FIG. 16.

Figures 2, 3, 4:
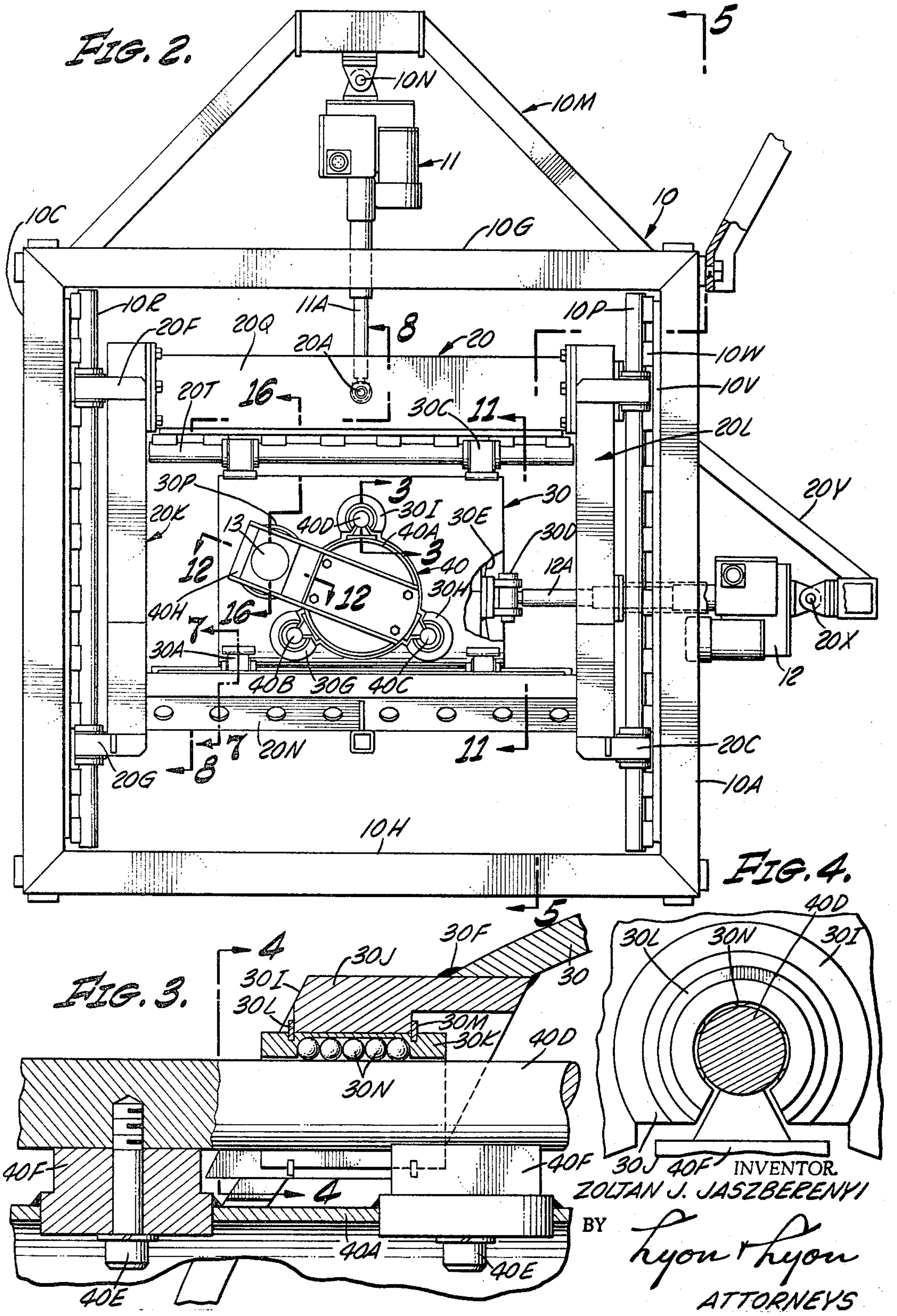
FIG. 2 is a view taken substantially as indicated by the lines 2—2 in FIG. 1.
FIG. 3 is a sectional view taken substantially as indicated by the lines 3—3 in FIG. 2.
FIG. 4 is a sectional view taken substantially as indicated by the lines 4—4 in FIG. 3.

FIG. 16 is a view taken substantially as indicated by the lines 16—16 in FIG. 2.

Figures 17, 18:
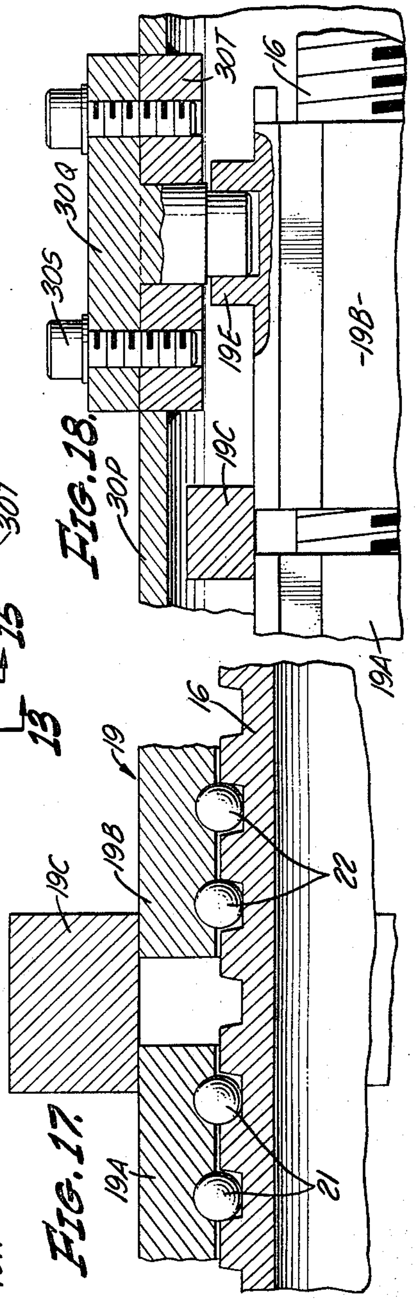

FIG. 17 is a view taken substantially as indicated by the lines 17—17 in FIG. 13.

FIG. 18 is a view taken substantially as indicated by the lines 18—18 in FIG. 15.

Figures 1, 19, 20, 21:
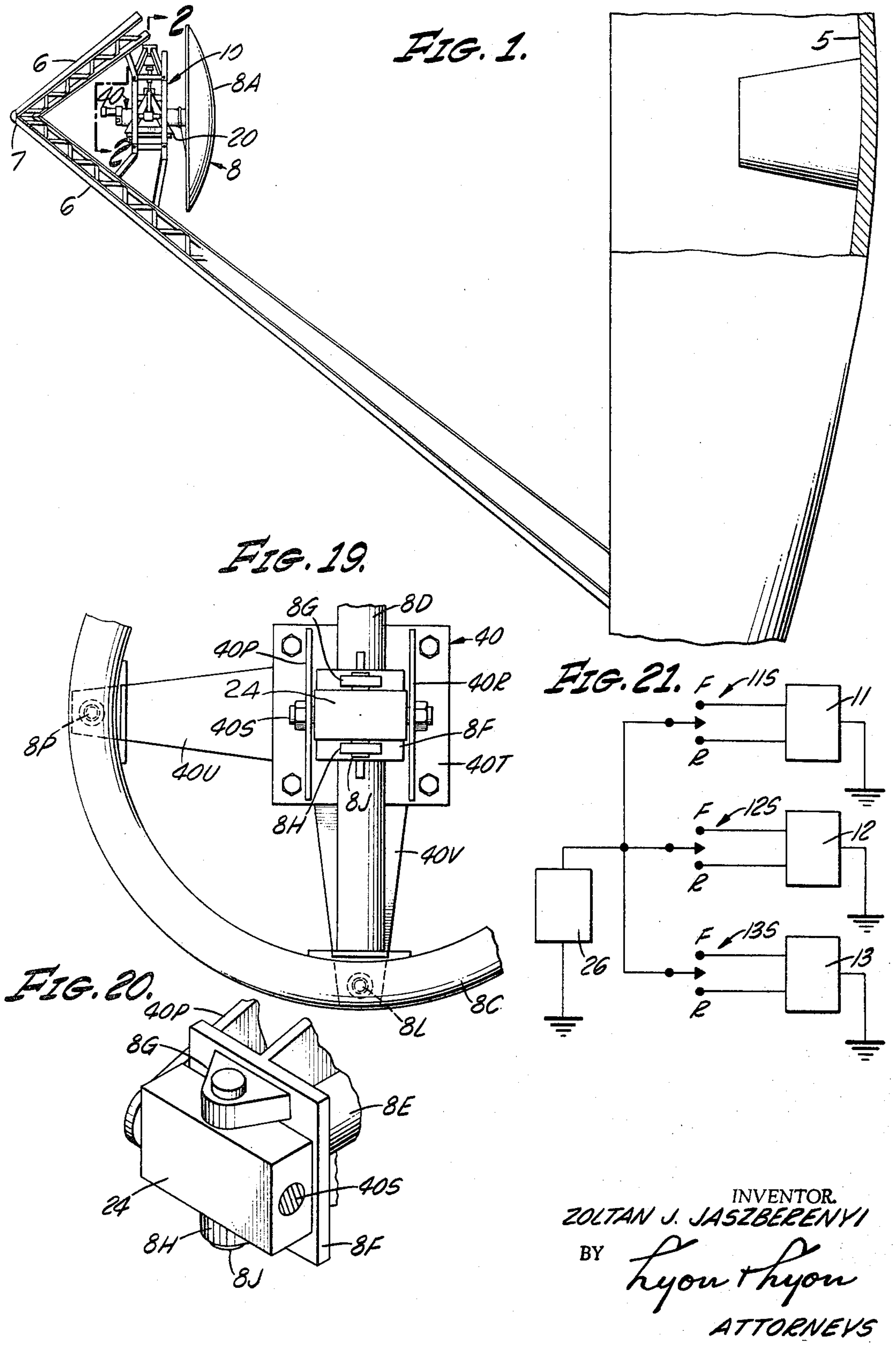
Figure 6:
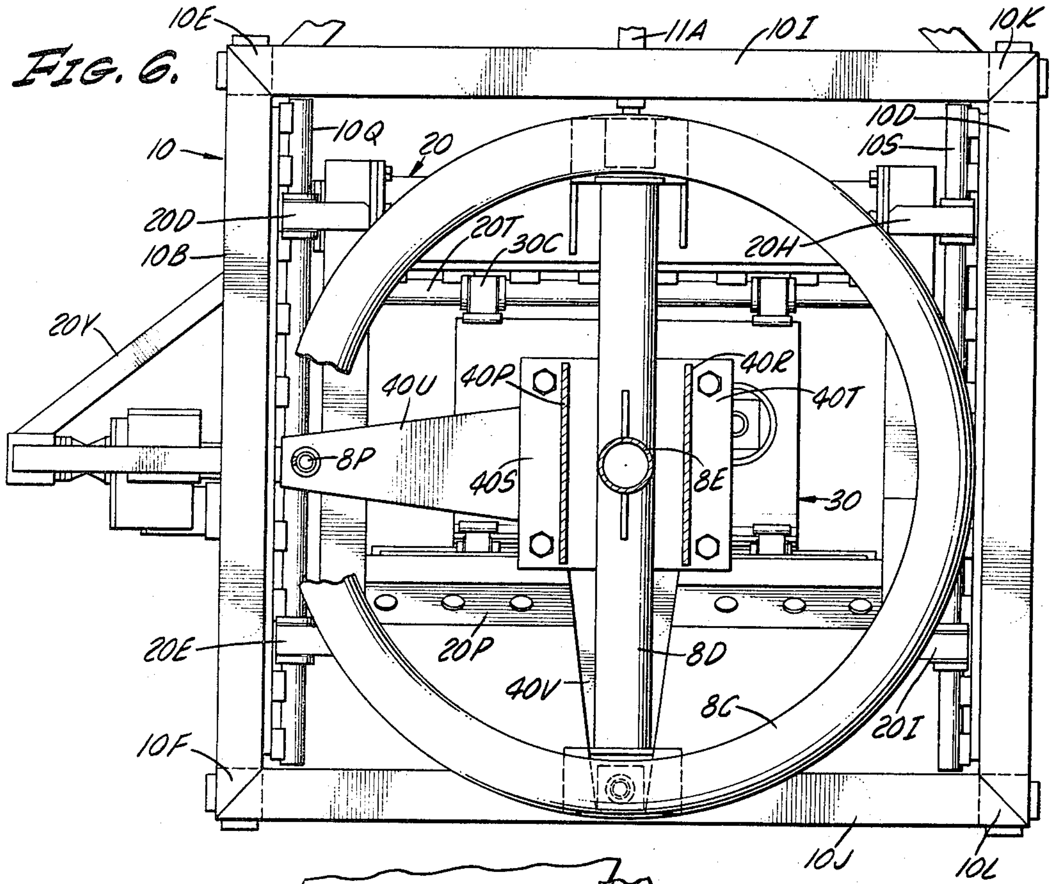
FIG. 6 is a view taken substantially as indicated by the lines 6—6 in FIG. 5.

FIG. 19 is a view similar to that in FIG. 6 showing, however, in more details the initial adjustment means.

FIG. 20 is a perspective view of a portion of the apparatus illustrated in FIG. 20.

FIG. 21 illustrates in simple form a control for the apparatus.

Referring to FIG. 1, the same illustrates generally a portion of a main reflector 5 which may be a large paraboloid reflecting dish suitably supported and braced using conventional supporting structure (not shown) from which equally spaced connected spars 6 (four in number) extend and converge at 7 where they are interconnected to provide an open supporting structure within which an open supporting frame structure 10 is rigidly mounted. A carriage structure 20 is slidably mounted for vertical movement (Y adjustment) in frame structure 10. A drum structure 30 is slidably mounted for horizontal movement (X adjustment) within carriage structure 20. A subreflector supporting structure 40 is slidably mounted within the drum structure 30 for movement (Z adjustment) in a direction mutually perpendicular to said vertical and horizontal movements whereby the subreflector 8 mounted on the structure 40 may be adjusted in each one of three mutually perpendicular planes.

The subreflector 8 may be in the form of a hyperboloid in a Cassegrain type antenna system and in accordance with aspects of the present invention is accurately adjusted with respect to the main reflector 5 for achieving optimum conditions in a satellite tracking system or in any other system where conditions in an antenna are to be optimized.

The supporting frame structure 10 which may be considered stationary for the present purposes (although mounted for joint movement with the paraboloid 5 during its movement) is in the general form of an open rectangular box, as seen in FIGS. 2, 5, 6 and 9, and includes: four vertically extending corner members, 10A, 10B, 10C, 10D; eight horizontally extending corner members 10E, 10F, 10G, 10H, 10I, 10J, 10K, 10L.

Figure 5:
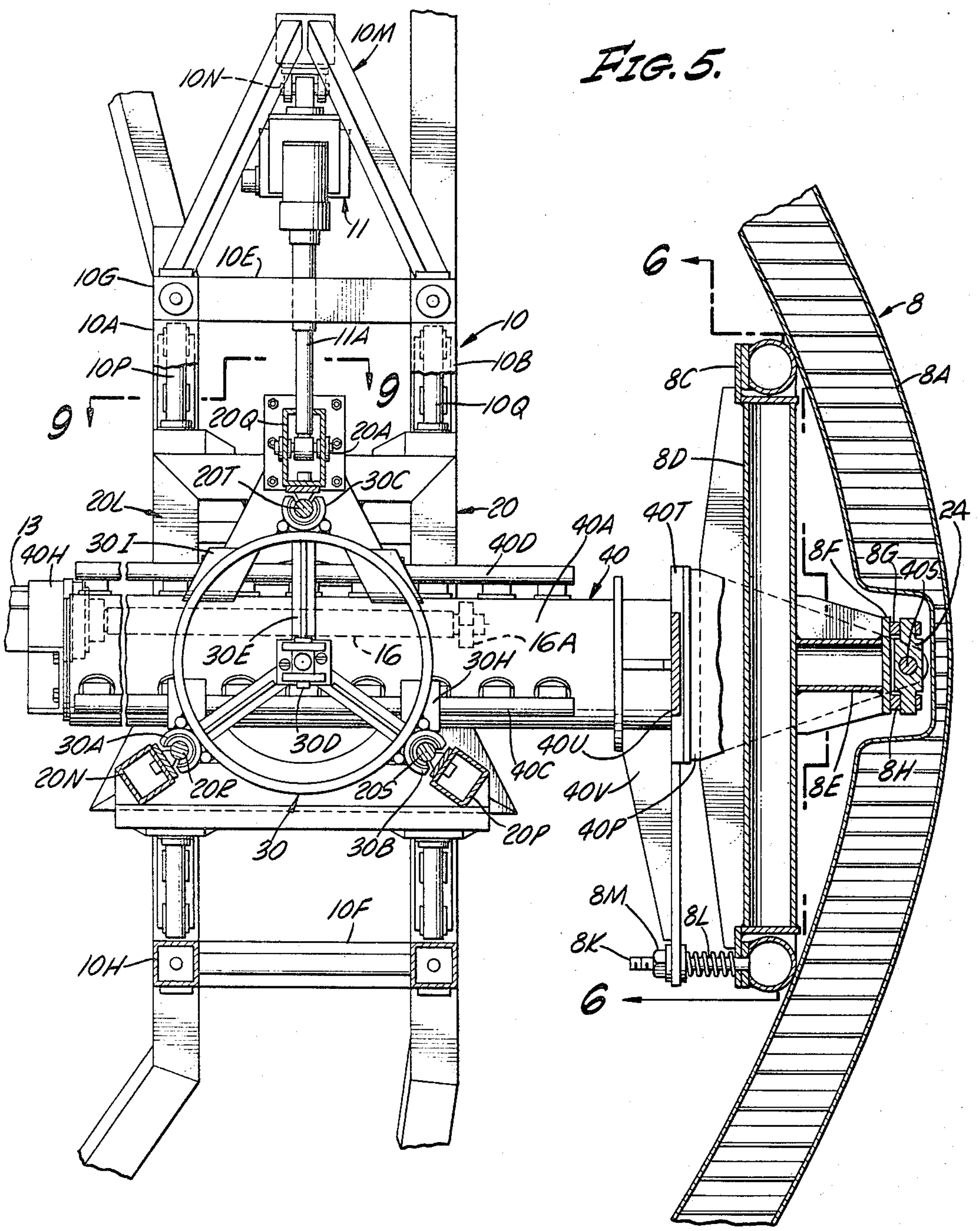
FIG. 5 is a sectional view taken substantially as indicated by the lines 5—5 in FIG. 2.

As seen in FIGS. 2 and 5, extending upwardly from and integrally formed with this frame structure 10 is an open truss structure 10M to a central point of which the housing of a linear actuator 11 is pivotally attached by pivot pin 10N.

The lower end of movable element 11A of actuator 11 is pivotally connected to the carriage structure 20 by pin 20A for producing vertical movement of the carriage structure 20 within the stationary frame 10 which has four like guide members 10P, 10Q, 10R and 10S cooperating with complementary guide means 20B, 20C, 20D, 20E, 20F, 20G, 20H, 20I on the carriage structure 20.

Figures 8, 9, 10, 11:
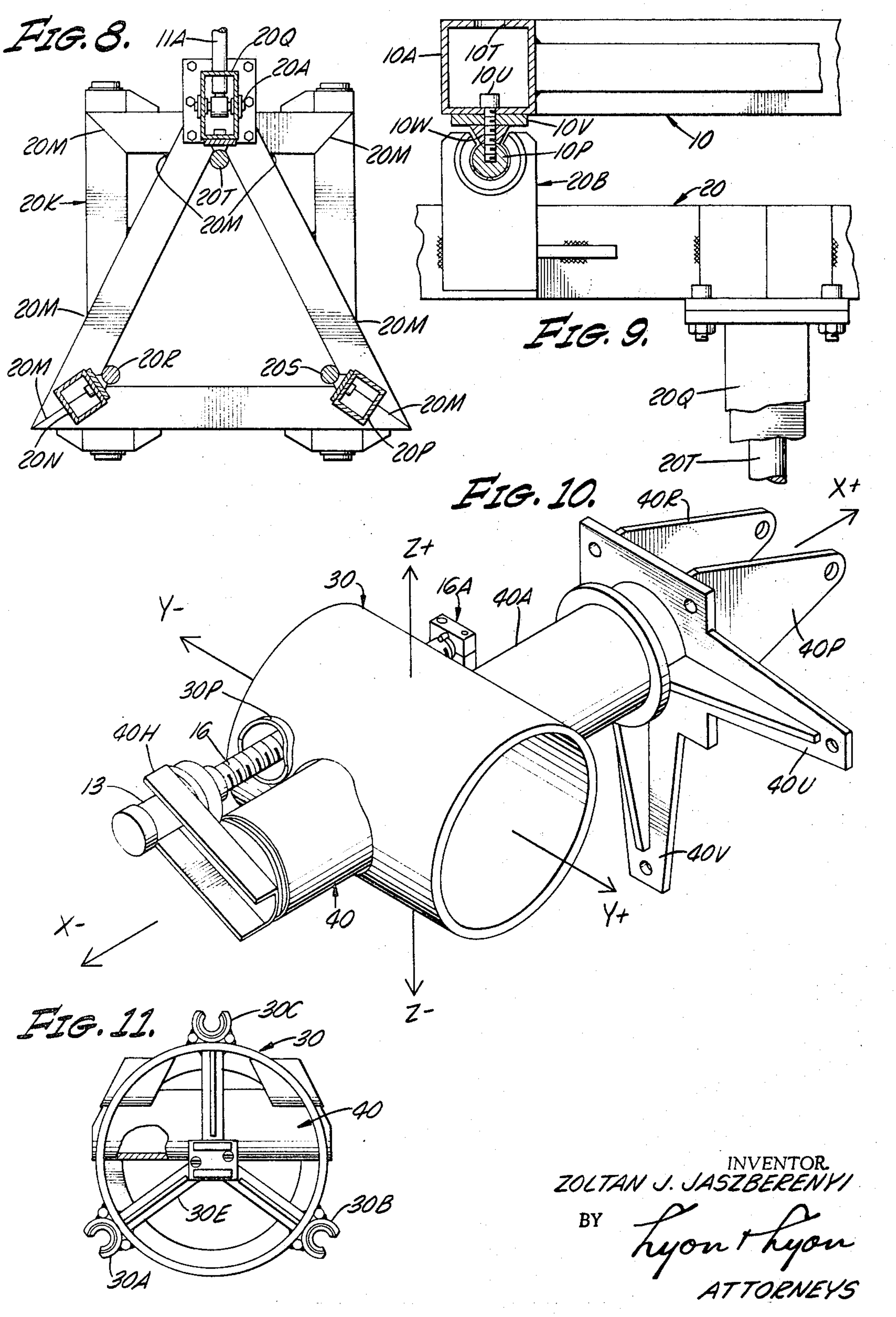
FIG. 8 is a sectional view taken substantially as indicated by the lines 8—8 in FIG. 2.
FIG. 9 is a view taken substantially as indicated by the lines 9—9 in FIG. 5.
FIG. 10 is a perspective view, somewhat incomplete, of the drum structure and the subreflector mounting structure and illustrates the three directions of movement obtainable.
FIG. 11 is a view taken substantially as indicated by the lines 11—11 in FIG. 2.

Each of these guide members 10P, 10Q, 10R and 10S are of identical construction, are essentially guide rods and are each supported in the same manner as now described in FIG. 9.

As seen in FIGS. 2 and 9, the guide rod 10P is mounted on the frame corner member 10A which is of generally hollow rectangular stock and which is provided with an apertured portion 10T to gain access to the fastening screw 10U. One of a series of screws or bolts 10U passes through an aligned apertured portion of the member 10A, an elongated bar 10V and one of a series of spacer elements 10W shaped to conform with rod 10P; and each of a series of such bolts 10U is threaded into the rod 10P.

Figure 7:
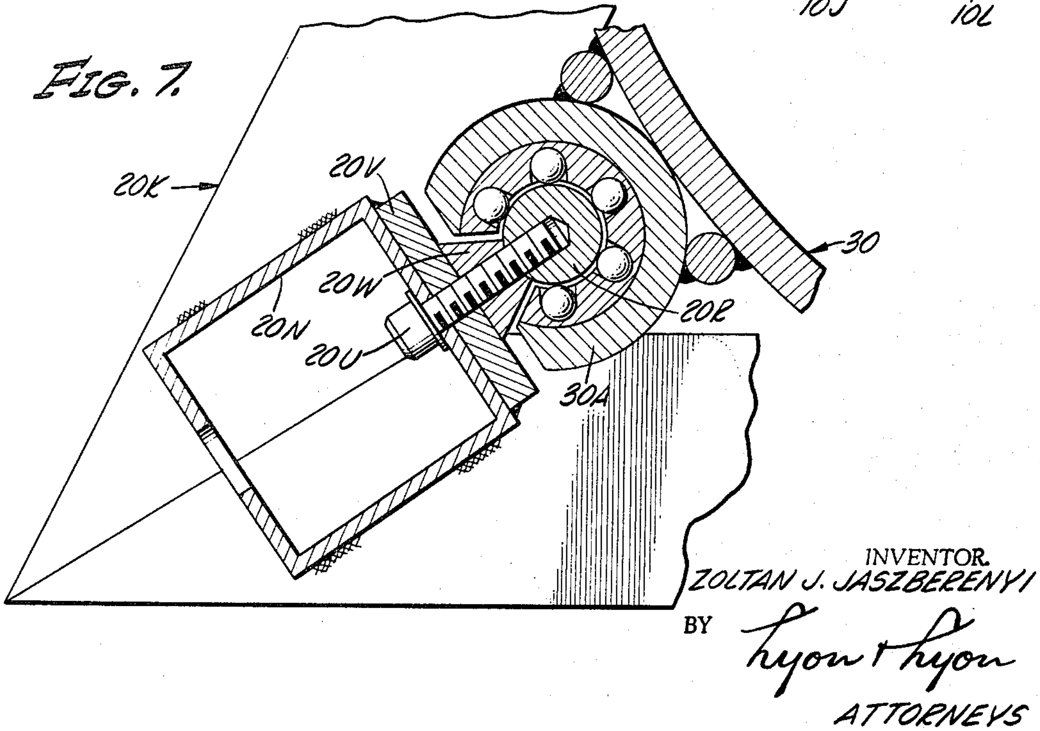
FIG. 7 is a view taken substantially as indicated by the line 7—7 in FIG. 2.

The carriage structure 20, as seen in FIGS. 2, 6, 8 and 9, is formed with two end sections 20K, 20L each of identical configuration. As shown in FIG. 8, the end section 20K is formed of sections of mitered square or rectangular tubing, such sections being secured together at their ends as indicated by welds 20M to define generally a frame member having a generally outer rectangular peripheral portion and an open inner triangular portion. These end sections 20K and 20L (FIG. 2) are secured together as, for example, by welding to the ends of a pair of lower horizontally extending elements 20N, 20P and an upper horizontally extending element 20Q. These elements 20N, 20P, 20Q define generally the corners of a triangle in each of which a corresponding horizontally extending guide rod 20R, 20S, 20T is mounted using identical mounting structure, as described above in connection with FIG. 9 and also illustrated in FIG. 7 wherein the exemplified guide rod is illustrated at 20R, with one of its securing bolts 20U extending through a wall of element 20N, elongated reinforcing bar or strap 20V and a corresponding one of a series of spacer elements 20W.

These three carriage guide members 20R, 20S, 20T provide a support and a guide structure for the drum assembly 30 which, as illustrated in FIGS. 5 and 11, has three equally circumferentially spaced cooperating guide means 30A, 30B, 30C whereby such drum assembly 30 may be moved and positioned in a horizontal direction by a linear actuator 12 (FIG. 2) having its housing pin connected by pin 20X to a bracket 20Y on and extending from carriage 20, the movable element 12A of the actuator 12 being connected by pin 30D to the central portion of a three-legged spider 30E (FIGS. 2 and 5) mounted internally of drum assembly 30.

The subreflector supporting structure 40 is supported on the drum structure 30 using the following described structure involving its tubular portion 40A on the periphery of which are mounted three equally circumferentially spaced guide rods 40B, 40C and 40D (FIGS. 2 and 5) each having its axis extending parallel to the axis of tubular portion 40A. These support and guide rods 40B, 40C and 40D are each mounted on the tubular portion 40A by bolts 40E, as exemplified in FIGS. 7 and 9, wherein identical guide rods are supported; but, in FIGS. 3 and 4, the spacers 40F are in the form of inserts welded in the tubular portion 40A.

These guide rods 40B, 40C, 40D each extend through and cooperate respectively with identical spaced bearing guide means 30G, 30H, 30I (FIG. 2) on the drum assembly 30, as exemplified in FIGS. 3 and 4, wherein the bearing guide means 30I includes generally a sleeve member 30J from which a segment of less than 180 degrees has been removed so that such sleeve member 30J extends circumferentially around the guide rod for a distance greater than 180 degrees, this modified sleeve member 30J being secured to the drum assembly 30 by weld 30F. Within such modified sleeve member 30J is a correspondingly shaped ball retaining member 30K which is secured to the sleeve member 30J by a pair of spaced retaining ring segments 30L, 30M recessed within grooved portions of the ball retainer 30K, the retainer 30K being internally grooved to accommodate and retain a series of bearing balls 30N. This arrangement described in FIGS. 3 and 4 applicable specifically to the guiding structure between assemblies 30 and 40 suffices also as a description of the identical ball bearing guide means used not only in guiding movement of the carriage 20 on the frame 10 but also in guiding movement of the drum assembly 30 on the carriage 20 since they each contemplate identical guide structures.

To produce movement of the subreflector mounting means or assembly 40 within the drum assembly 30, the following described motor driven screw arrangement is provided. It should be noted at this point that the axis of the tubular portion 40A intersects the axis of the drum assembly 30.

As seen in FIGS. 2 and 12, a motor and bearing mounting plate 40H is secured by bolts 40J to a disc 40G welded in tubular portion 40A. A driving motor 13 has its housing mounted on plate 40H, with its shaft 13A extending therethrough, and such shaft mounts a gear 13B splined with an internal gear in a rotatably supported screw driving member 14 which is rotatably supported in annular bearings 15 having their outer race members fitted in a plate 40K secured by bolts 40L to plate 40H. These bearings 15 are retained by a ring 40M secured by bolts 40N to plate 40K and also by a ring 18.

An elongated screw 16 has one of its ends threaded into and secured by bolt 17 to the driving member 14, the bolt 17 extending through the ring 18 threaded on driving member 14 and also through the driving member 14 and tubular screw member 16 so that when the reversible motor 13 is energized, the screw member rotates correspondingly.

This screw member 16, as seen in FIG. 16, extends through a two-piece adjustable ball nut structure 10 which is prevented from turning, the same being connected to a tube 30P passing through and having its ends welded as an integral part of the drum assembly 30 so that rotation of the screw 16 results in a reaction on the screw 16 to cause the assembly 40 to slide in the assembly 30.

For these purposes and to minimize backlash in this screw driven assembly, the ball nut assembly 19 includes two internally grooved nut members 19A, 19B (FIG. 17)

within which a series of circumferentially disposed balls 21 and 22 are retained for engagement with the base and side wall of the thread on the screw member 16. After these two nut members 19A, 19B are adjusted by turning the same on the screw member 16 to produce more or less engagement of the balls on the screw thread, i.e. to take up any slack or end play in the assembly, the two nut members 19A, 19B are secured together as a unit by the clamping member 19C. As seen in FIGS. 16 and 18, the nut half 19B is provided with two diametrically opposed socket portions 19E, 19F within which a pin portion of a corresponding one of plates 30Q and 30R extends for preventing turning of the nut assembly 19, the plates 30Q and 30R being secured by bolts 30S to a corresponding one of the two plates 30T welded as a part of the drum assembly 30.

To limit movement of the screw member 16, its extreme end is provided with stop means 16A (FIGS. 16 and 14) thereon, such stop means 16A being illustrated as two plates 16B, 16C clamped against flat portions of the screw member 16 by bolts 16D, with stop pins 16E extending from such plates for cooperative engagement with portions 19G, 19H (FIG. 16) on the nut member 19B.

The particular manner in which the subreflector 8 is initially adjusted on its supporting means 40 is now described in relation to FIGS. 5, 6, 19 and 20.

The subreflector 8, as indicated in FIG. 5, may be of conventional honeycomb construction and is provided with a reflecting surface 8A and a mounting ring structure 8C secured thereto. Such ring structure 8C is formed integrally with an internal tube 8D whose axis extends diametrically and generally vertically through the center of the ring structure. Such tube 8D at its center portion has formed therewith a second axially extending tube 8E upon which is mounted a plate 8F (FIG. 20) from which, in turn, a pair of spaced apertured ears 8G, 8H extend. A pivot pin 8J extends through ears 8G, 8H and also through a block 24 to which arms 40P, 40R (FIG. 19) of the assembly 40 are also pin-connected by a threaded pin 40S. The axes of pins 8J and 40S are mutually perpendicular.

These arms 40P, 40R extend from a plate 40T as essentially a part of a yoke structure which straddles the tube 8D and plate 8F on tube 8E, the plate 40T being integrally formed with the tubular portion 40A.

A pair of arms 40U, 40V extend radially outwardly from plate 40T to make an included angle of approximately 90° between such arms 40U, 40V. The ends of such arms 40U, 40V are each adjustably connected to the subreflector ring 8C, as illustrated in FIG. 5, wherein a stud bolt 8K extending from the ring 8C passes through a coil compression spring 8L and an apertured portion in the end of arms 40V, the bolt 8K having a nut 8M threaded thereon so that turning of the nut 8M results in relative movement between the subreflector 8 and its support 40 and more specifically turning of the subreflector 8 about the axis of the horizontal pin 40S. Likewise, an adjustment about the vertical axis is obtained by a like adjustment mechanism 8P at the end of the other arm 40U whereby adjustment of the subreflector may be accomplished by its pivoting about the vertical axis of pin 8J.

These adjustments made at the ends of arms 40U and 40V are essentially initial alignment adjustments and other adjustments in operation of the antenna may be made from a remote location at which the energization of the linear actuators 11, 12 and motor 13 are controlled as exemplified in simplified form in FIG. 21, wherein these three elements, namely the actuators 11, 12 and motor 13, may be selectively energized to accomplish the previously mentioned X, Y and Z adjustments either singly or in combination.

In the simplified form shown in FIG. 21 each of the actuators 11, 12 and motor 13 are of the reversible type and are illustrated as each having one of their leads grounded and two of their other leads connected to different stationary terminals of a corresponding combination three-position Off and reversing switch 11S, 12S and 13S. The movable switch arm of each of these switches each having a neutral or Off position is connection to one terminal of a power source having its other terminal grounded.

Thus, for example, to obtain a Z adjustment, the movable arm of switch 13S is moved from its center or Off position to engage either the F (forward) or R (reverse) contact of switch 13S to thereby correspondingly move the subreflector 8 either towards or away from the main reflector 5, and after the desired adjustment is made, the switch arm is returned to its center or Off position.

These adjustments may be made in accordance with data and information obtained in observing or tracking a target using the instant antenna and the same may be made such that such data and information appears in most intelligible and most usable form.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an antenna structure, a main reflector; a subreflector; a spar structure connected to said main reflector; a frame structure mounted on said spar structure; a first carriage structure; means slidably mounting said first carriage structure on said frame structure for movement of said carriage structure in a first direction; a second carriage structure; means slidably mounting said second carriage structure on said first carriage structure for movement in a second direction which is substantially perpendicular to said first direction; a subreflector supporting structure; means slidably mounting said supporting structure on said second carriage structure for movement in a direction which is substantially mutually perpendicular to said first direction and said second direction; and means connecting said subreflector to said supporting structure.

2. An antenna structure as set forth in claim 1, including first power operated means interconnecting said frame structure and said first carriage structure; second power operated means interconnecting said first and said second carriage structures; and third power operated means interconnecting said second carriage structure to said supporting structure.

3. An antenna structure as set forth in claim 2, including means selectively operating said first, second and third power operated means.

4. An antenna structure as set forth in claim 1, including adjustable means mounting said subreflector on said supporting means.

5. In an antenna structure, a stationary open frame structure; said frame structure being generally rectangular and defined in part by four corner members; guide means on each of said four corner members; a carriage structure having generally rectangular ends within said frame structure; said end members having guide means thereon cooperating with the previously mentioned guide means for guiding movement of said carriage means in a first direction; a linear actuator interconnecting said frame structure and said carriage structure for producing said movement in said first direction; said carriage structure having means interconnecting said end members and defining a generally triangular interconnecting structure between said end members; guide means mounted in and on each of the three corners of said interconnecting structure; a drum structure having guide means cooperating with said guide means in said corners for guiding movement of said drum structure in a second direction which is perpendicular to said first direction; a tubular subreflector supporting structure extending transversely through said drum structure; cooperating guide means between said drum structure and said supporting structure for guiding movement of said supporting structure in a third direction which is mutually perpendicular to said first and second directions; a second linear actuator interconnected between said carriage structure and said drum structure for producing said movement in said second direction; elongated screw means extending in said third direction; nut means on said drum structure and threaded on said screw means; motor means mounted on said supporting structure and coupled to said elongated screw means for rotating the same; and a subreflector mounted on said supporting structure.

6. A structure as set forth in claim 5, including means for adjusting said nut means with respect to said screw means to eliminate substantially all lost motion between said nut means and said screw means.

7. In an antenna structure, a supporting structure; a subreflector; means adjustably mounting said subreflector on said supporting structure; said means including: a pair of arms extending radially from said supporting structure and generally radially from the axis of said subreflector; said arms defining generally a right angle; a support member mounted on said subreflector; a support element; means pivotally mounting said member on said element for pivotal movement about a first axis; means pivotally mounting said supporting structure on said element for pivotal movement about a second axis which is perpendicular to said first axis; first adjustable means between said support member and one of said arms for pivotally adjusting said subreflector about said first axis; second adjustable means extending between the other of said two arms and said supporting member for pivotally adjusting said subreflector about said second axis.

8. In an antenna structure, a triangular supporting structure defined by three parallel extending corner members; guide means within said triangular supporting structure mounted on each of said corner members to extend coextensive with said corner members; a drum structure; guide means externally of said drum structure and cooperating with the first mentioned guide means to guide movement of said drum structure in a first direction; an antenna supporting structure extending transversely through said drum structure; cooperating guide means between said supporting structure and said drum structure for guiding movement of said supporting structure in a second direction which is perpendicular to said first direction; an antenna element mounted on said supporting structure; a screw-threaded element extending through said drum structure; nut means threaded on said screw element and connected to said drum element; means mounted on said supporting structure for rotating said screw element; and means for moving said drum structure within said triangular supporting structure.

References Cited

UNITED STATES PATENTS

| | | | |
|---|---|---|---|
| 2,003,171 | 5/1935 | Burrell | 350—83 |
| 2,419,556 | 4/1947 | Feldman | 343—761 |
| 2,895,372 | 7/1959 | Tacklind et al. | 350—199 XR |
| 3,164,835 | 1/1965 | Alsberg | 343—779 |

ELI LIEBERMAN, *Primary Examiner.*